United States Patent [19]

Brunner

[11] 3,718,487
[45] Feb. 27, 1973

[54] PANCAKE-MAKING MACHINE
[75] Inventor: Fred William Brunner, Eugene, Oreg.
[73] Assignee: Mannings, Inc., San Francisco, Calif.
[22] Filed: Feb. 12, 1971
[21] Appl. No.: 114,958

[52] U.S. Cl. ............................... 99/353, 99/423
[51] Int. Cl. ........................................ A47j 37/06
[58] Field of Search ........ 99/423, 334, 353, 443, 355, 99/395; 107/4 D, 57, 58, 66; 431/328

[56]     References Cited
         UNITED STATES PATENTS 2,899,914   8/1959   Van Arsdell ................. 99/423 X
1,848,104   3/1932   Brand ......................... 99/423 X
3,097,588   7/1963   De Jersey .................... 99/423 X
3,225,716  12/1965   Krooss et al. ................ 99/423 X Primary Examiner—Billy J. Wilhite
Assistant Examiner—Arthur O. Henderson
Attorney—Christen & Sabol

[57]     ABSTRACT

An apparatus for continuously making pancakes is described. The apparatus includes a series of griddle plates pivotally mounted on an endless conveyor, a blade arranged to travel between a griddle plate and partially cooked pancakes thereon and a device for swinging each plate about its axis so as to transfer partially cooked pancakes thereon to the next forward plate in the direction of travel with the pancakes in an upside-down position.

5 Claims, 11 Drawing Figures

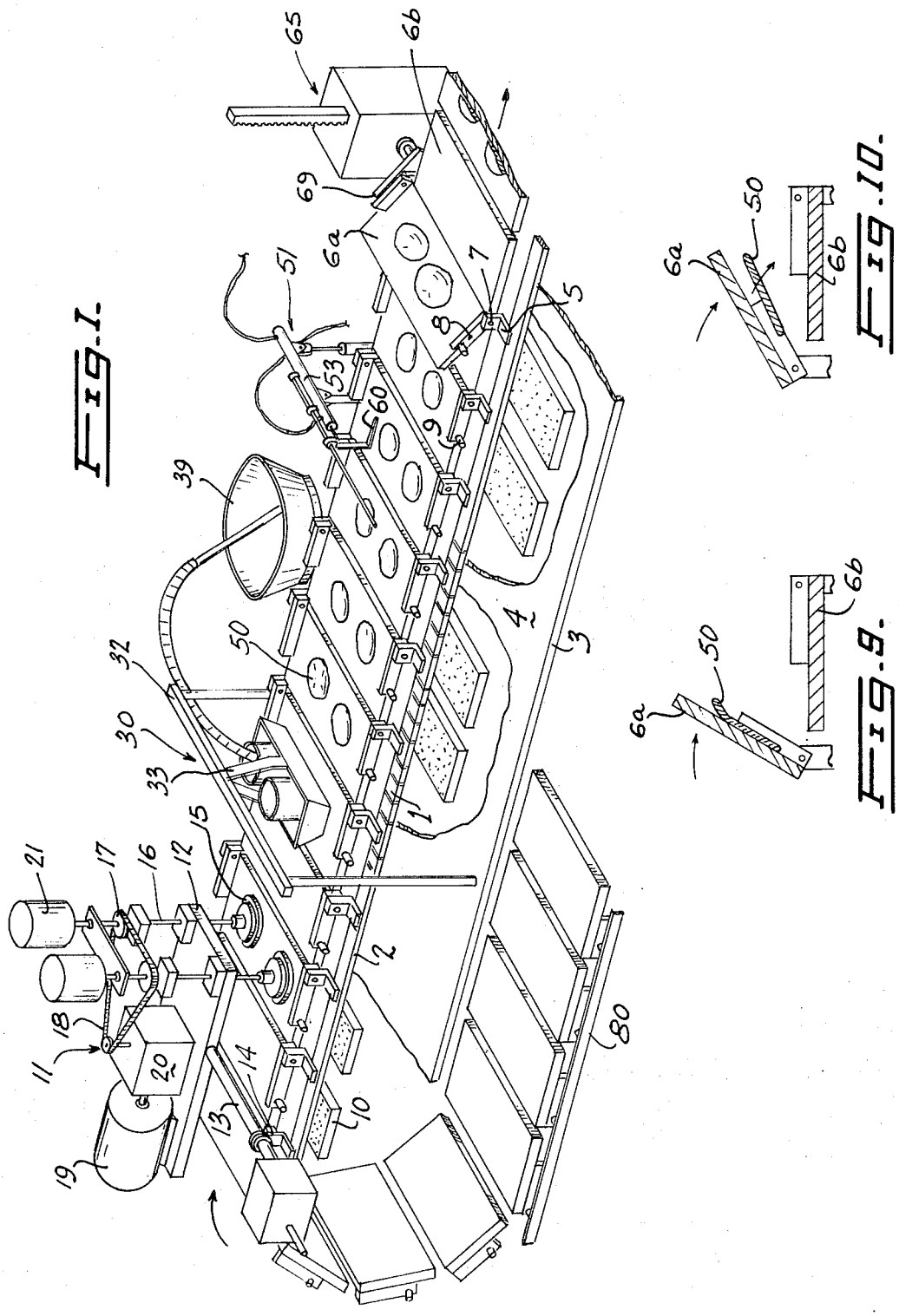

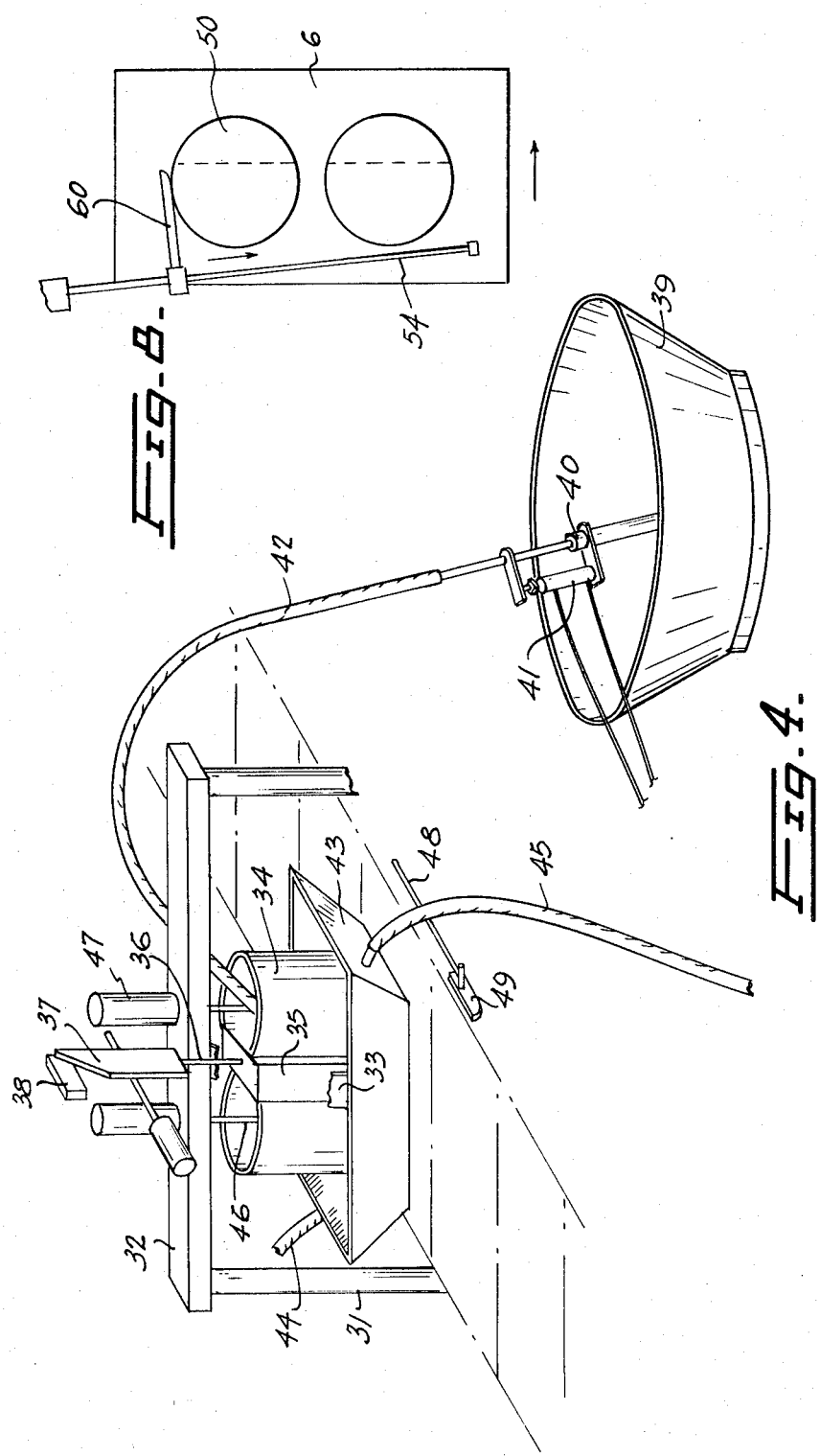

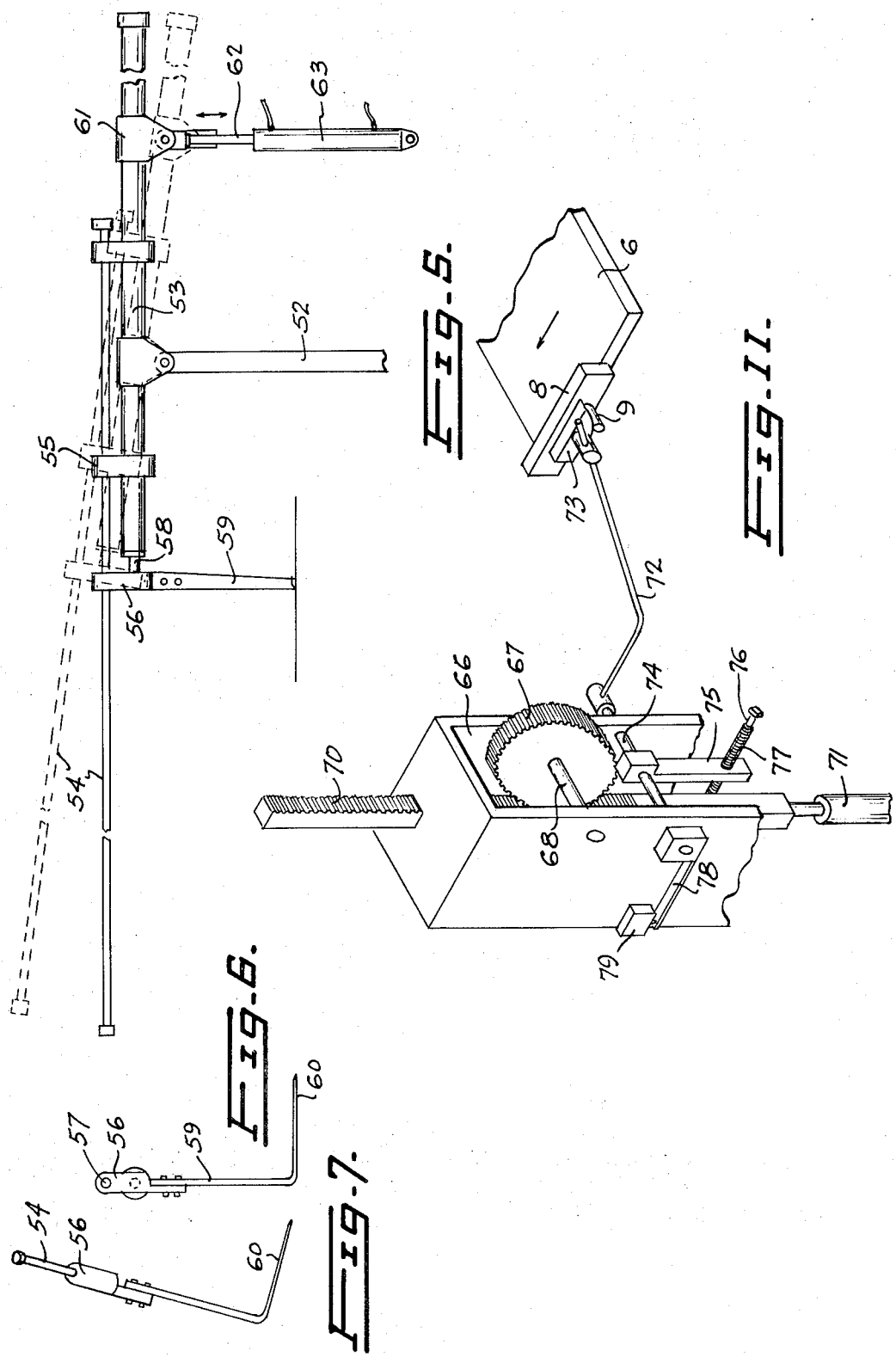

PANCAKE-MAKING MACHINE

BACKGROUND OF THE INVENTION

1. Field of the Invention

The invention relates to a continuous device for cooking pancakes.

2. Description of the Prior Art

Pancakes have long been known and are flat cakes of batter cooked in a pan or on a griddle. They are normally prepared from the batter immediately before serving.

The trend today in the food industry is towards convenience foods of all types and more and more the trend is towards foods which are fully prepared in a factory and are ready for heating and serving in the home. Even in large institutions such as schools, universities, hospitals, etc. there has been a very marked trend in recent years in the direction of having the foods prepared outside the institution and ready for heating and serving directly without large amounts of preparation in the institution itself.

In keeping with the above trend, there is a market today for pancakes which have been precooked and fast-frozen and are ready to simply be heated and served. In the preparation of large numbers of pancakes for freezing and marketing, there has, of course, arisen a need for an automatic machine for making pancakes. Considering the fact that the ability to properly flip a pancake has always been looked upon as somewhat of an art, it will readily be appreciated that transferring this art to an automatic machine presents some very unique problems.

It is the object of the present invention to provide an automatic machine which will make fully cooked pancakes which are completely similar to the usual home-prepared pancakes.

SUMMARY OF THE INVENTION

The pancake machine of this invention has an endless conveyor carrying a series of griddle plates. Each of these plates is pivotally mounted at its leading edge on an axis transverse to the direction of travel of the conveyor. Since the cooking surface must be completely level, a support table is provided for carrying the conveyor in a horizontal plane during the portion of travel in which cooking is taking place. An automatic dispensing device is provided for depositing metered amounts of batter on each plate in the horizontal plane and means are provided for heating the plates to cooking temperature. A horizontally disposed blade is arranged to move beneath partially cooked pancakes on a plate and this blade moves in a direction substantially transverse to the direction of travel of the conveyor. This blade serves to slice beneath the pancakes and release at least a substantial portion of each pancake from sticking to the plate. Immediately following this blade arrangement is a device for swinging each plate about its axis so as to transfer the partially cooked pancakes thereon to the next forward plate in the direction of travel with the pancakes in an upside-down position so that the other half of the pancake will now be cooked. At the end of the horizontal table portion an arrangement is provided for removing the totally cooked pancakes from the plates.

DESCRIPTION OF PREFERRED EMBODIMENTS

The griddle plates are suitably in the form of rectangular cast-iron plates of about one-fourth to three-eighths inch thickness. These plates are preferably mounted on a pair of conveyor chains by pivotal connections and can vary in dimensions depending on the number of pancakes to be placed in a row on each plate.

The griddle plates are preferably heated by a radiant heating arrangement such as gas burners or electrical units placed beneath the moving plates on the support table. Since the griddle plates arriving from the return run onto the horizontal level cooking zone have lost some heat, they must first be quickly brought to cooking temperature and then maintained at a uniform cooking temperature while travelling along the support table. This necessitates a very careful arrangement of the heating units and, for instance, the heating units at the beginning of the horizontal zone are placed very close beneath the plates to quickly bring them up to temperature while the remaining heating elements along the support table are placed systemmatically further away from the heating plates in proper relationship to maintain a substantially constant temperature along the length of the cooking zone.

Since pancakes while cooking normally tend to stick to the cooking surface, it is necessary to provide some type of arrangement for separating the pancake from the surface. This is accomplished according to the invention by providing a very thin blade which moves across the conveyor and passes beneath the partially cooked pancakes on each plate. The operation of this blade was found to be quite critical to the successful operation of the machine and for instance, if the blade passes completely beneath the pancakes on a plate, when this plate starts to swing about its axis to flip the pancakes, the pancakes will merely slide down the plate and become entangled in the space between the two plates thus ruining the pancakes. On the other hand, if the blade does not pass a sufficient distance beneath the pancakes on the plate, as the plate starts to swing about its axis the pancakes will simply roll up into a roll and again be destroyed. It was found however, that if the blade passed approximately two-thirds of the diametral distance from the trailing edge beneath the pancakes on a plate, the pancakes would smoothly curl off the plate and when the plate had reached the position of about 45° with respect to the next forward plate the pancakes would completely leave the plate and land upside-down on the next forward plate.

It was also found that the speed of rotation of the plate for flipping the pancakes had to be very carefully controlled so that the pancakes would smoothly leave the plate at the appropriate time and land flat and upside-down on the next forward plate. A very suitable method for accomplishing this smooth speed of rotation of the plates consists of a crank arm mounted to a rack and pinion arrangement. This crank is arranged such that as the plate comes into engagement with it the arm is actuated, quickly swinging the plate about its axis to deposit the pancakes onto the next forward plate and then quickly swinging the plate down to its horizontal position so that that plate, now empty, is ready to receive pancakes from the next following plate which is then entering engagement with the crank arm.

In order that the pancakes will be of uniform quality and will not contain any burnt particles, etc. it is important to have the plates properly cleaned and oiled with a cooking oil before they receive the batter. This can be accomplished by means of rotating heads at the beginning of the horizontal zone and these heads, which are continuously oiled with vegetable oil, serve to burnish and thus clean the surfaces and also to provide a thin film of oil to provide the proper cooking surfaces for cooking the pancakes.

This machine produces pancakes of very excellent and uniform quality and a small unit cooking only two pancakes on each griddle plate can produce pancakes at a rate of about 140 to about 200 per hour.

In the drawings which illustrate the invention,

FIG. 1 is a perspective view of the pancake making machine;

FIG. 4 is a perspective view of a batter dispensing device;

FIG. 5 is a side elevation of a transversely moving cutter blade;

FIG. 6 is an end elevation of a cutter blade in operative position;

FIG. 7 is an end elevation of the blade not in operative position;

FIG. 8 is a top plan view of the blade in operative position;

FIG. 9 is a partial sectional view showing a pancake being flipped;

FIG. 10 is a partial sectional view showing the completion of the flipping of the pancake; and FIG. 11 is a perspective view of the drive mechanism for rotating a griddle plate.

Figure 3:
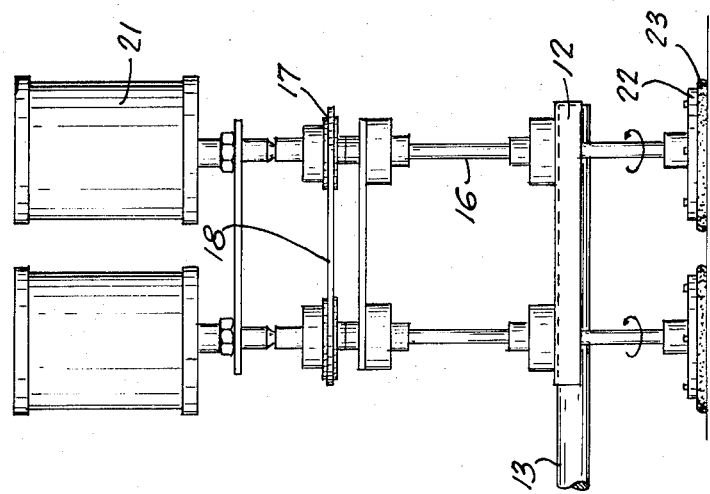
FIG. 3 is an end elevation of the device shown in FIG. 2.

As will be seen from FIG. 1, the machine is generally in the form of an endless belt conveyor having a pair of endless chains 1 mounted to travel in tracks 2. These tracks are supported on a support structure having frame portions 3 and side walls 4. The side walls are preferably made from insulating, heat resistant material, such as asbestos sheet.

Connected to chains 1 are L-shaped brackets 5 to which are mounted cast-iron griddle plates 6 by way of pivot pins 7 between the brackets 5 and end plates 8 of the griddle plates 6. The end plates 8 also include outwardly extending rollers 9 whose function will be explained later.

The griddle plates 6 travel along the tracks 2 as shown and are heated to a suitable temperature for cooking pancakes (about 425° to about 490°F.) by means of a series of infrared gas burners 10. Since it is important to quickly bring the griddle plates 6 arriving on the tracks 2 up to the desired cooking temperature, the burners 10 at the leading end of the tracks 2 are placed very close to the plates 6 and this distance between the burners and the plates is gradually increased as shown along the length of the machine so that a substantially constant temperature is maintained on the plates themselves.

Figure 2:
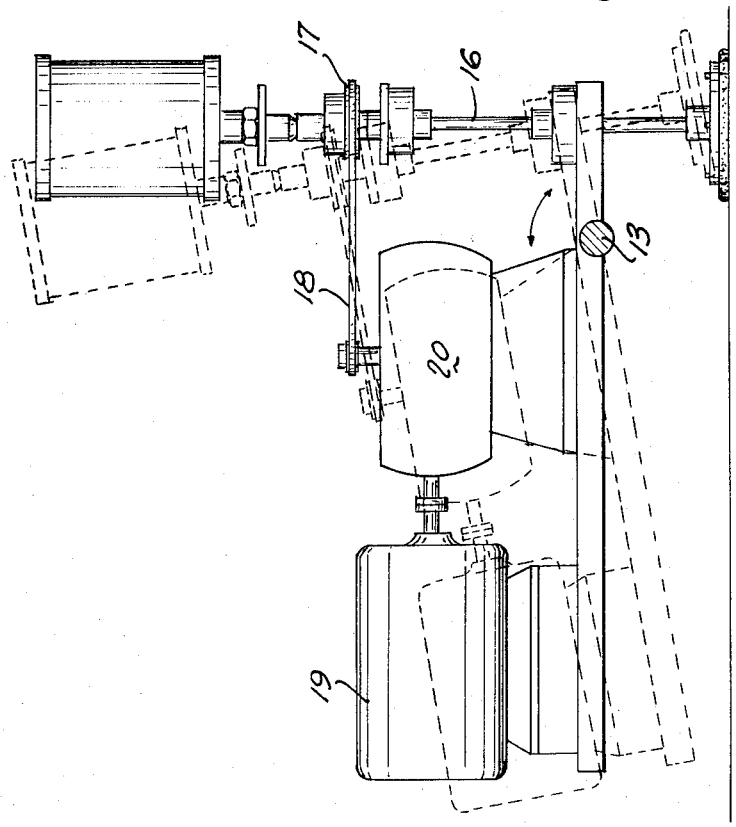
FIG. 2 is a side elevation of a burnishing and oiling device.

The plates 6 as they arrive on tracks 2 have two areas thereon burnished and oiled ready to receive pancake batter. This is done by a burnishing and oiling device 11 which includes a support 12 fixed to a transverse shaft 13 which is pivotally mounted on brackets 14. Thus, the device pivots up and down between the two positions shown in FIG. 2.

A pair of oiling and burnishing heads 15 are mounted on rotatable shafts 16 which are rotatably driven by means of toothed wheels 17 via chain 18 which is driven by electric motor 19 through gear box 20. Above the rotating shafts 16 are mounted oil reservoirs 21 which feed oil down through the oil shafts to the burnishing and oiling heads 15.

Each oiling and burnishing head 15 includes a circular plate 22 to which is fixed a resilient pad 23. Over this head is placed a terry cloth cover with a drawstring and a fresh terry cloth cover is applied before each daily operation of the machine.

The swinging of the burnishing and oiling head out of and into engagement with the griddle plates passing beneath is accomplished by means of an arm connected to one end of shaft 13, this arm in turn being connected to an air cylinder. The air cylinder is actuated by means of a rider arm which is moved by means of the projecting rollers 9 on the end plates 8 of the griddle plates 6. Thus, as each plate 6 passes beneath the burnishing and oiling heads, they swing down into engagement with that plate, cleaning the plate in two locations and providing a thin layer of oil, thus preparing the plate to receive the pancake batter.

Measured amounts of batter are deposited on the prepared plates as they pass beneath the batter feeding station 30. This batter feeder is supported on a support frame consisting of two vertical supports 31 and cross beam 32. From cross beam 32 there extends down a pair of support arms 33 which support the batter feeder. This batter feeder includes a pair of individual devices 34 such as are available from Belshaw Bros. Inc. and the interiors of these two slurry feeders 34 are flow connected by means of a central area 35. A float is provided in this central area 35 and this float is connected by shaft 36 to a pivotally mounted device 37 which actuates an air valve 38. This float arrangement is for controlling the level of batter to be maintained in the central area 35 and hence the slurry feeders 34.

The batter is stored in a large container 39 and is pumped from the container 39 by a reciprocating pump 40 actuated by an air cylinder 41 which in turn is controlled by the air valve 38 actuated by the float. The batter is pumped into the slurry feeder through the flexible hose 42.

The slurry feeders 34 are mounted in a cooling trough 43 to which cooling water is supplied through inlet line 44 and discharged through water outlet line 45. This cooling arrangement maintains the temperature of the batter being deposited at approximately 50°F. and the purpose of maintaining this temperature is to minimize gas formation in the batter prior to deposition and to ensure that substantially uniform amounts are deposited on the griddle.

The bottoms of the slurry feeders 35 include well-known spring-loaded slurry metering devices which are actuated by vertically extending shafts 46 which connect to air cylinders 47 mounted on cross beam 32. These air cylinders are actuated by means of an air valve which is controlled from a pivotally mounted rider arm 48 having a rider head 49 which rides over rollers 9 on the end plates 8 of griddle plates 6 thus swinging arm 48 and actuating the air valve. When a plate 6 passes beneath the slurry feeders 34 and the air cylinders 47 are actuated, two metered amounts of batter are deposited on the plate. This same rider arm 48 and coacting air cylinder also simultaneously actuate the burnishing and oiling head.

The deposited portions of batter 50 travel along on the griddle plates 6 and are cooked. Since there is a tendency for the cooked pancakes to stick to the plate, a cutter blade must be used to cut beneath the pancakes 50 before they can be flipped. This cutter blade device is shown generally by the numeral 51 and details of the arrangement can be seen from FIGS. 5 to 8. A vertically extending support 52 has pivotally connected thereto an air cylinder 53. A rod 54 is attached to the top of air cylinder 53 by means of a pair of brackets 55 and this rod extends a considerable distance beyond the end of air cylinder 53 and substantially across the width of a cooking plate 6. Mounted on this rod 54 is a slide block 56 having a hole therein 57 through which the rod 54 passes. This block 56 is also connected to cylinder shaft 58 of air cylinder 53 and reciprocates along rod 54 by means of the action of air cylinder 53. Extending downwardly from slide block 56 is an L-shaped stainless steel cutter blade having a downwardly extending arm 59 and a thin blade portion 60 which passes beneath the pancakes on the plate 6 as illustrated in FIG. 8. The rod 54 is arranged at a slight forward angle with respect to the transverse axis of the plates to compensate for the speed of forward movement of the plates so that a substantially equal portion will be sliced beneath each pancake as shown in FIG. 8. The portion beneath each pancake which has been sliced in this operation is an important feature of the invention as will be described hereinafter.

The outer end of air cylinder 53 is connected via bracket 61 to cylinder rod 62 of vertically mounted air cylinder 63. This swings the air cylinder 53 upwardly and downwardly on its pivot mount on support 52 so that when the blade 60 is passing beneath portions of the pancakes as shown in FIG. 8 the device is in the position shown in the solid lines in FIG. 5 while when the blade is reciprocating in the opposite direction to that shown in FIG. 8, i.e., returning to its starting position, the rod 54 and connected blade 60 have swung up into the position shown in the broken lines in FIG. 5. The air cylinders 53 and 63 are actuated simultaneously by an air valve which is controlled by an arrangement to be described hereinafter.

After the blade 60 has passed beneath the pancakes on a plate, they are now ready for flipping and this is accomplished by a plate rotating device 65. This plate rotating device 65 includes a main housing 66 in which is mounted a pinion 67 on a rotatable shaft 68. One end of shaft 68 extends beyond the housing 66 and has connected thereto a channel shaped crank arm 69. This crank arm in ready position is horizontally aligned and in this position the outward extending roller 9 mounted on end plate 8 of griddle plate 6 enters into the channel portion. As the roller 9 enters the channel shaped arm 69 the crank arm is quickly rotated causing the plate 6a to commence swinging as shown in FIG. 1. As the plate 6a swings past the vertical position as shown in FIG. 9, the upper edge of the pancake commences pulling away from the plate 6a and when the plate has swung over to about the 45° position as shown in FIG. 10 the pancake has been completely released from the plate and is now being thrown in the flipped position onto the next plate 6b which is at that stage empty. In controlling this flipping action, it has been found that if the blade 60 cuts all of the way beneath the pancakes 50, the pancakes will tend to slide down the plate by the time it has reached a vertical position and become tangled between two plates and thus be ruined. On the other hand, if an insufficient portion of the pancake has been sliced, when the plate has reached the position shown in FIG. 9 the pancake will not simply peel off in the manner shown but will tend to roll up and fall onto the empty plate 6b in a rolled position so that it is once again ruined. It has been found that if the blade 60 slices approximately two-thirds of the way beneath the pancakes diametrally from their trailing edges a smooth transfer is achieved from plate 6a to plate 6b as shown.

The pinion 67 is driven by means of rack 70 which is reciprocated by means of air cylinder 71. The control mechanism for the air cylinder comprises a rider arm 72 having a rider head 73 mounted on the end thereof. This head 73 rides up over rollers 9 causing the arm 72 to swing upwardly and downwardly. The arm 72 is fixed to a rotatable shaft 74 and also fixed to this rotatable shaft 74 is an intermediate arm 75. Passing through this arm 75 is a rod 76 on which is mounted a coil spring 77. This spring 77 biases arm 75 in such a manner as to urge the sliding head 73 in a downward direction. Mounted on the end of shaft 74 remote from arm 72 is a third arm 78 and this arm 78 engages an air valve 79. Spring 77 tends to urge the end of arm 78 into engagement with air valve 79. This air valve 79 actuates air cylinder 71 which drives the rack 70 as well as the air cylinders 53 and 63 which drive the cutting blade mechanism.

In operation, as the roller 9a of the plate 6a enters channel-shaped arm 69, the roller 9 of the next following plate 6 passes beneath head 73 forcing it upwardly. This moves arm 78 away from air valve 79 and this action causes the air valve 79 to actuate the air cylinders to which it is connected. When this happens, the air cylinder 71 pulls the rack 70 downwardly causing the pinion 67 to rotate, thus swinging the crank arm 69 and causing the plate 6a to flip the pancakes onto the next plate 6b as described above. Simultaneously with this action, the blade 60 passes beneath the pancakes resting on the plate 6 passing beneath the blade mechanism.

The flipped pancakes then continue along on the plates 6 travelling on the tracks 2 to the end of the tracks where the plates are tilted at an angle as they travel around sprockets at the end of the machine. At this point, they are removed for packaging and, if desired, freezing and the plates return to the front end of the device on support tracks 80 which support the plates 6 on both sides by means of the projecting rollers 9.

The drive mechanism for the conveyor is conventional and may comprise, for example, a gear wheel which engages the sprocket chain and which is driven via a chain drive through a vari-speed gearhead motor conveniently located at the front end of the machine where the initial pancake deposit is made.

While the foregoing description refers to preferred embodiments of the invention, it is to be understood that the words which have been used are words of description, rather than of limitation, and that changes within the purview of the appended claims may be made without departing from the true scope and spirit thereof.

What is claimed is:

1. A pancake making machine which comprises:
   a. an endless conveyor including a series of griddle plates, each said plate being pivotally mounted at its leading edge on an axis transverse to the direction of travel of the conveyor,
   b. a support table for carrying the conveyor in a horizontal plane during a portion of its travel,
   c. means for depositing batter on each plate in the horizontal plane,
   d. means for heating the horizontal plates to cooking temperatures,
   e. a horizontally disposed blade arranged to move beneath partially cooked pancakes on a plate in a direction substantially transverse to the direction of travel of the conveyor,
   f. means following said blade for swinging each plate about its axis so as to transfer the pancakes thereon to the next forward plate in the direction of travel in upside-down position, said blade being mounted for travel on a rod extending transversely across the conveyor, and said rod being at a slight forward angle to compensate for the speed of forward travel of the conveyor, and
   g. means for removing the completely cooked pancakes from the griddle plates.

2. A machine as claimed in claim 1 wherein said rod is mounted to pivot about a horizontal axis at one side of the conveyor.

3. A machine as claimed in claim 2 wherein the blade is driven along the rod by means of a horizontally mounted air cylinder and is swung up and down into and out of engagement with a griddle plate by means of a second air cylinder connected to a pivot arm portion extending beyond the horizontal axis.

4. A pancake making machine which comprises:
   a. an endless conveyor including a series of griddle plates, each said plate being pivotally mounted at its leading edge on an axis transverse to the direction of travel of the conveyor,
   b. a support table for carrying the conveyor in a horizontal plane during a portion of its travel,
   c. means for depositing batter on each plate in the horizontal plane,
   d. means for heating the horizontal plates to cooking temperature,
   e. a horizontally disposed blade arranged to move beneath partially cooked pancakes on a plate in a direction substantially transverse to the direction of travel of the conveyor,
   f. a crank arm following said blade for swinging each plate about its axis so as to transfer the pancakes thereon to the next forward plate in the direction of travel in upside-down position, and
   g. means for removing the completely cooked pancakes from the griddle plates.

5. A machine as claimed in claim 4 wherein said crank arm is actuated by a rack and pinion arrangement.

* * * * *